United States Patent
Krasner et al.

(10) Patent No.: US 11,294,702 B2
(45) Date of Patent: *Apr. 5, 2022

(54) METHOD AND SYSTEM FOR PROCESSING DATA USING A PROCESSING PIPELINE AND PROCESSING UNITS

(71) Applicant: EMC IP Holding Company LLC, Hopkinton, MA (US)

(72) Inventors: Jonathan I. Krasner, Coventry, RI (US); Steven R. Chalmer, Redwood City, CA (US); Serge Joseph Pirotte, Coventry, RI (US); Steven T. McClure, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/400,945

(22) Filed: May 1, 2019

(65) Prior Publication Data

US 2020/0348959 A1 Nov. 5, 2020

(51) Int. Cl.
| *G06F 9/455* | (2018.01) |
| *G06F 9/445* | (2018.01) |
| *G06F 9/38* | (2018.01) |
| *G06F 9/54* | (2006.01) |

(52) U.S. Cl.
CPC ........ *G06F 9/45558* (2013.01); *G06F 9/3851* (2013.01); *G06F 9/3867* (2013.01); *G06F 9/44594* (2013.01); *G06F 9/544* (2013.01); *G06F 2009/4557* (2013.01); *G06F 2009/45583* (2013.01); *G06F 2009/45595* (2013.01)

(58) Field of Classification Search
CPC .. G06F 9/45558; G06F 9/3851; G06F 9/3867; G06F 9/44594; G06F 9/544; G06F 2009/4557; G06F 2009/45583; G06F 2009/45595

See application file for complete search history.

(56) References Cited

U.S. PATENT DOCUMENTS

| 7,035,954 | B1 | 4/2006 | Duran |
| 7,284,119 | B2 | 10/2007 | Hyder |
| 7,656,894 | B2 | 2/2010 | Dube |
| 8,479,294 | B1* | 7/2013 | Li ............................ G06F 21/56 |
| | | | 726/24 |
| 9,378,049 | B1* | 6/2016 | Johnson .............. G06F 13/4068 |
| 9,477,466 | B2 | 10/2016 | Nishimoto |
| 9,529,620 | B1 | 12/2016 | Dow |
| 10,216,681 | B2 | 2/2019 | Ahmed et al. |
| 10,229,471 | B2 | 3/2019 | Avkarogullari et al. |
| 10,353,722 | B2 | 7/2019 | Karino |
| 2003/0084435 | A1 | 5/2003 | Messer |
| 2006/0098018 | A1 | 5/2006 | Tarditi, Jr. |
| 2007/0256058 | A1 | 11/2007 | Marfatia et al. |
| 2011/0154334 | A1 | 6/2011 | Beale |
| 2012/0110346 | A1 | 5/2012 | Resch |

(Continued)

*Primary Examiner* — Emerson C Puente
*Assistant Examiner* — Jonathan R Labud
(74) *Attorney, Agent, or Firm* — Chamberlin, Hrdlicka, White, Williams & Aughtry (57) ABSTRACT

A method for processing data includes receiving an offload request by a first virtual machine (VM), issuing, in response to the offload request and based on a processing pipeline, a processing request to a processing unit, and servicing, by the processing unit, the processing request to obtain a result.

17 Claims, 5 Drawing Sheets

(56) References Cited

U.S. PATENT DOCUMENTS

| | | |
|---|---|---|
| 2014/0180903 A1* | 6/2014 | Parsons ................. G06Q 40/04 705/37 |
| 2014/0189039 A1 | 7/2014 | Dalton |
| 2014/0230067 A1 | 8/2014 | Sahita et al. |
| 2015/0154111 A1 | 6/2015 | Dabreu |
| 2016/0164962 A1 | 6/2016 | Ghosh |
| 2016/0344844 A1 | 11/2016 | Lin |
| 2017/0085636 A1 | 3/2017 | Lin |
| 2017/0289059 A1 | 10/2017 | Wu |
| 2018/0046385 A1 | 2/2018 | Altaparmakov |
| 2018/0107525 A1* | 4/2018 | Govindaraju ............. G06F 8/71 |
| 2018/0341549 A1 | 11/2018 | Bolkhovitin et al. |
| 2019/0098367 A1 | 3/2019 | Jung et al. |
| 2019/0171485 A1 | 6/2019 | Bolkhovitin et al. |
| 2020/0334184 A1 | 10/2020 | Suresh |

* cited by examiner

METHOD AND SYSTEM FOR PROCESSING DATA USING A PROCESSING PIPELINE AND PROCESSING UNITS

BACKGROUND

Computing devices may include any number of internal components such as processors, memory, and persistent storage. As the number of internal components in a computing device increases, the complexity of efficiently using all of the internal components also increases. As a result, the internal components in a computing device are often not utilized in the most efficient manner, e.g., to maximize the performance of the computing device.

SUMMARY

In general, in one aspect, the invention relates to a method for processing data. The method includes receiving an offload request by a first virtual machine (VM), issuing, in response to the offload request and based on a processing pipeline, a processing request to a processing unit, and servicing, by the processing unit, the processing request to obtain a result.

In general, in one aspect, a non-transitory computer readable medium in accordance with one or more embodiments of the invention includes computer readable program code, which when executed by a computer processor enables the computer processor to perform a method for processing data. The method includes receiving an offload request by a first virtual machine (VM), issuing, in response to the offload request and based on a processing pipeline, a processing request to a processing unit, and servicing, by the processing unit, the processing request to obtain a result.

In general, in one aspect, a system includes a processor, a plurality of processing units, shared memory, a host operating system executing on the processor, and virtual machines (VMs) executing on the host operating system, wherein one of the VMs is programmed to perform a method for processing data. The method includes receiving an offload request, issuing, in response to the offload request and based on a processing pipeline, a processing request to a processing unit, and servicing, by the processing unit, the processing request to obtain a result.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a data storage operation. More specifically, embodiments of the invention relate to a method for a host operating system of a host computing device to offload the processing of data to graphics processing units (GPUs) prior to the data being stored. The GPUs, by having a larger number of cores than a processor used by the host operating system, may be equipped to handle the large amount of computation required to perform the data processing. Embodiments of the invention may determine a processing pipeline to perform on the data based on client requests obtained from the host operating system. Embodiments of the invention, after performing the processing pipeline, may generate processed data that the host operating system may obtain and store in a storage device (e.g., a backup storage device).

Figure 1:
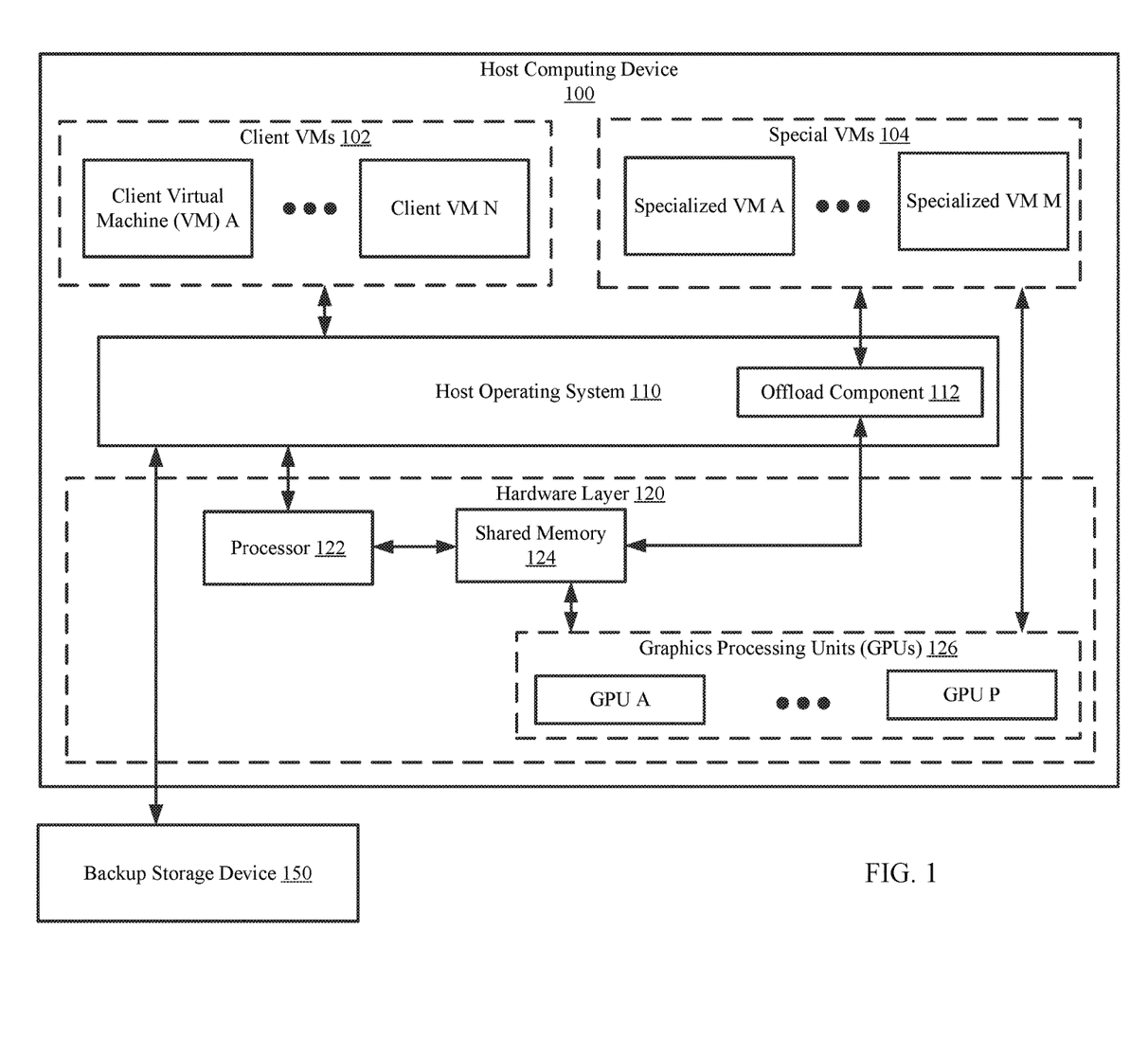
FIG. 1 shows a diagram of a system in accordance with one or more embodiments of the invention.

FIG. 1 shows an example system in accordance with one or more embodiments of the invention. The system includes a host computing device (100) and a backup storage device (150). The system may include additional, fewer, and/or different components without departing from the invention. Each component may be operably connected via any combination of wired and/or wireless connections. Each component illustrated in FIG. 1 is discussed below.

In one or more embodiments of the invention, the host computing device (100) hosts any number of client virtual machines (VMs) (102). The client VMs (102) may be logical entities executed using computing resources (e.g., components of a hardware layer (120)) of the host computing device (100). Each of the virtual machines may be performing similar or different processes. In one or more embodiments of the invention, the virtual machines provide services to users, e.g., clients (not shown). For example, the virtual machines may host instances of databases, email servers, and/or other applications. The virtual machines may host other types of applications without departing from the invention.

In one or more embodiments of the invention, the host computing device (100) hosts specialized VMs (104). The specialized VMs (104) include functionality to interact with the graphical processing units (GPUs) (126). More specifically, the specialized VMs (104) include computer readable code (e.g., the GPU drivers and other related software components) that enables the specialized VMs to interact with the GPUs based on the Application Program Interfaces (APIs) or communication specifications of the GPUs. The specialized VMs (104) may interact with the components of the hardware layer (120) without using the host OS (110); rather, the specialized VMs may interact with the components of the hardware layer (120) using a communication protocol such as a peripheral component interconnect (PCI) pass-through. In one or more embodiments of the invention, the specialized VMs (104) each include their own operating system (OS) that allows the specialized VMs (104) to perform the aforementioned functionality. The OSes executing in the specialized VMs (104) may be equipped to communicate with an offload component (112) of the host OS (110).

In one or more embodiments of the invention, instead of communicating directly with the GPUs, the specialized VMs (104) may communicate with the GPUs using a hypervisor (not shown). The hypervisor may be an entity that is interposed between the specialized VMs (104) and the offload component (112) of the host OS (110). Further, the hypervisor may be equipped to facilitate communication between the specialized VMs and the GPUs (126) and interface with the specialized VMs (104). Such that each of the specialized VMs (104) may communicate with the GPUs (126) through the hypervisor. Other protocols or communication mechanisms may be used without departing from the invention.

In one embodiment of the invention, the host computing device may include different types of GPUs, where each the different types of GPUs use different communication protocols and/or have different functionality. In this scenario, the host computing device may include different types of specialized VMs, each type of specialized VMs is able to interact with a specific type of GPU. In such scenarios, the different types of the specialized VMs may be optimized to work with particular types of GPUs. Further, if a new GPUs is added to the host computing device change, a new or modified specialized VM may be added to the host computing device such that the host computing device can utilize the new GPU.

In one embodiment of the invention, the specialized VMs include functionality to service offload requests (discussed below in FIGS. 2A-2B) in a manner that most efficiently utilizes the GPUs processing capabilities, such as parallel processing.

Additional detail about various embodiments related to the operation of the specialized VMs is provided below with respect to FIG. 2B.

Figure 2A:
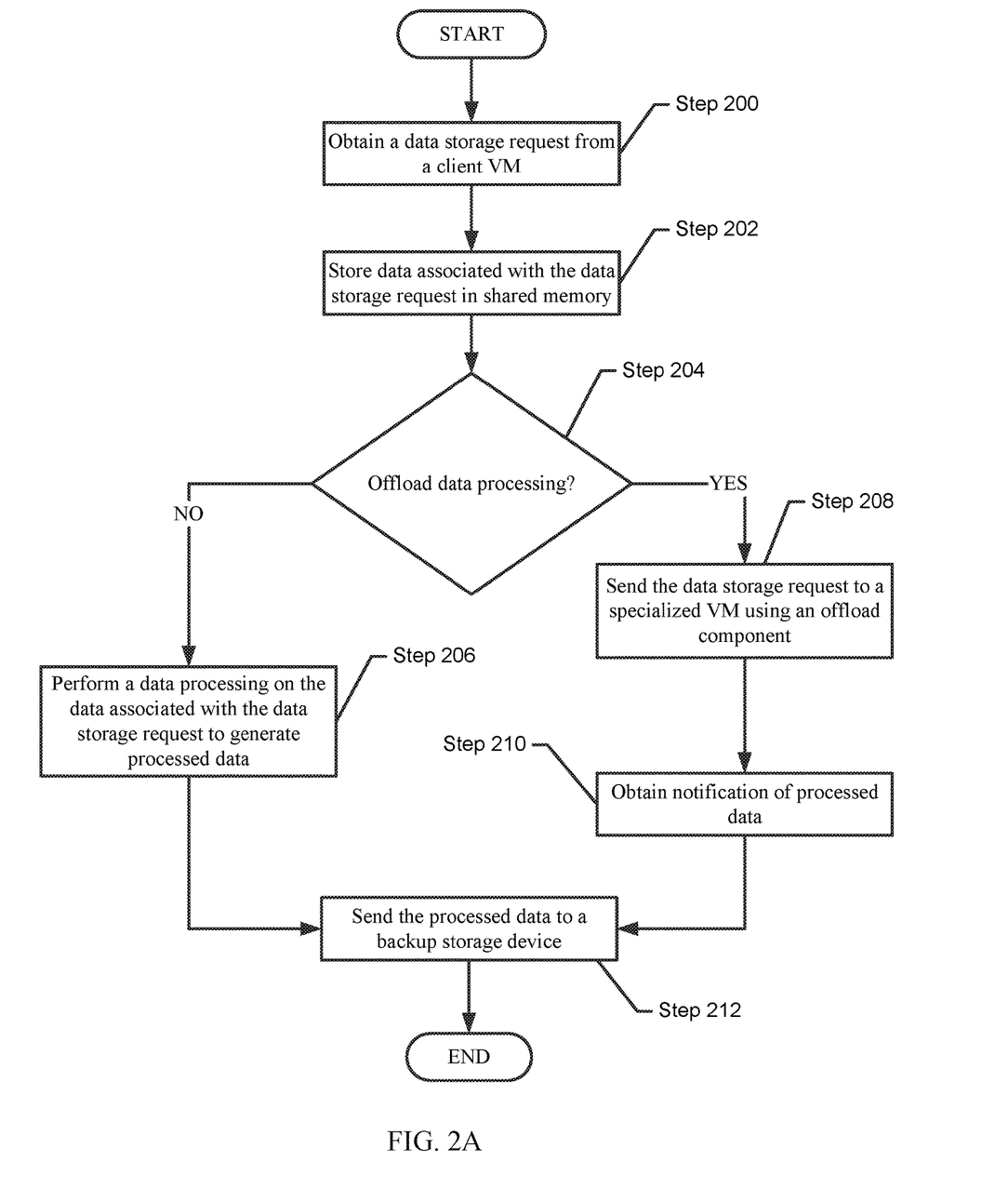
FIG. 2A shows a flowchart for managing client requests in accordance with one or more embodiments of the invention.
Figure 2B:
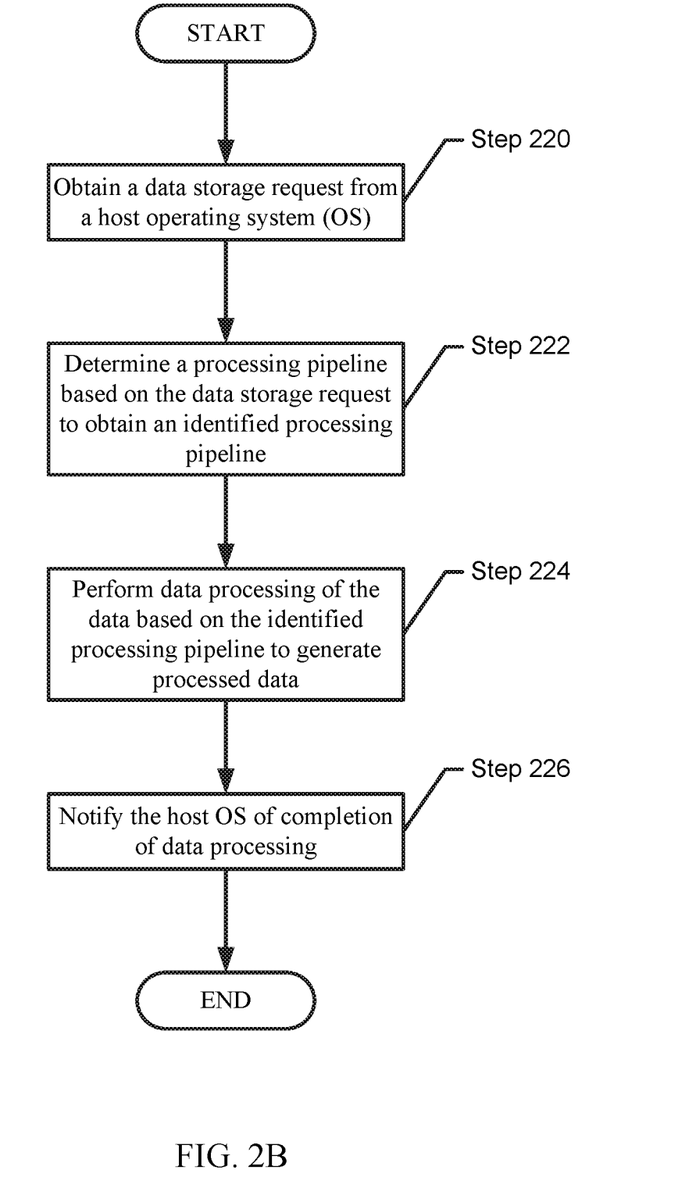
FIG. 2B shows a flowchart for managing data processing in accordance with one or more embodiments of the invention.

In one or more of embodiments of the invention, the virtual machines (102, 104) are implemented as computer instructions, e.g., computer code, stored on a persistent storage that when executed by a processor(s) (e.g., 122) of the host computing device (100) cause the host computing device (100) to provide the functionality of the virtual machines (102, 104) described throughout this application and/or all, or a portion thereof, of the methods illustrated in FIG. 2B.

In one or more embodiments of the invention, the hardware layer (120) includes computing resources utilized by components (e.g., the host OS (110), client VMs (102), the specialized VMs (104), and/or the offload component (112)) of the host computing device (100) to perform the functionalities specified by each respective component. The computing resources may include a processor(s) (122), shared memory (124), and one or more graphics processing units (GPUs) (126). Each computing resource of the hardware layer (120) may be operably connected via any combination of wired connections. Each computing resource of the hardware layer (120) is discussed below.

The processor (122) may be a computing resource that processes information (e.g., data) as requested by a component and sends the processed data to the requested entity. Processing data may include arithmetic calculations, logic processing, and/or other input/output operations without departing from the invention. In one or more embodiments of the invention, the processor (122) is implemented as a central processing unit (CPU) with single-core or multi-core processing capabilities. The processor (122) may be other types of processors without departing from the invention.

The shared memory (124) is volatile memory that may be accessed by two or more components of the host computing device (100). In one or more embodiments of the invention, the shared memory (124) is implemented as, for example, static random access memory (SRAM), dynamic random access memory (DRAM), and/or other types of memory without departing from the invention.

In one or more embodiments of the invention, the processor (122) includes additional memory (not shown) that may be used by the processor when processing data. The additional memory may be separate from the shared memory (124). The additional memory and the shared memory (124) may be operatively connected via a PCI express (PCI-E) bus that facilitates data transfer between the additional memory and the shared memory (124). Other communication mechanisms may be used to transfer data between the various shared memories without departing from the invention.

The GPUs (126) are a type of processors that includes a significantly larger number of cores than the processor (122) discussed above. The GPUs (126) may utilize the multiple cores to perform a large number of processes in parallel. The processes performed by the GPUs (126) may include basic arithmetic operations. The GPUs may perform additional types of processes without departing from the invention.

In one or more embodiments of the invention, the GPUs (126) include computing resources that allow the GPUs to perform the functions described throughout this application. The computing resources (not shown) within the GPUs may include cache, local memory (e.g., dynamic random access memory (DRAM)), and the cores discussed above. The cores may be capable of processing one or more threads (e.g., processes performed on data by a core of the GPU) at a time and temporarily storing data in the cache and/or local memory during the processing.

In one or more embodiments of the invention, the host computing device (100) operates using a host operating system (OS) (110). The host OS (110) is an operating system that manages the operation of the client VMs (102), the specialized VMs (104), and the hardware layer (120). The host OS (110) may service requests obtained from one or more of the client VMs (102). In one or more embodiments of the invention, the host OS (110) services the requests by assigning tasks to the specialized VMs (104) based on the requests. In one or more embodiments of the invention, the host OS (110) services the requests via the method illustrated in FIG. 2A.

In one or more embodiments of the invention, the host OS (110) is implemented as computer instructions, e.g., computer code, stored on a persistent storage that when executed by a processor(s) (e.g., 122) of the host computing device (100) cause the host computing device (100) to provide the functionality of the host OS (110) described throughout this application.

In one or more embodiments of the invention, the host OS (110) includes an offload component (112) that serves as an interface between the host OS (112) and the specialized VMs (104). The offload component (112) may send requests, updates, and or any other type of data to one or more of the specialized VMs (104) as specified by the host OS (110). In one or more embodiments of the invention, the offload component is implemented as, for example, an application programming interface (API). The offload component (112) may include functionality that allows the offload component (112) to communicate with operating systems of each of the specialized VMs (104).

In one or more embodiments of the invention, the offload component (112) is implemented as computer instructions, e.g., computer code, stored on a persistent storage that when executed by a processor(s) (e.g., 122) of the host computing device (100) cause the host computing device (100) to provide the functionality of the offload component (112) described throughout this application.

In one or more embodiments of the invention, the backup storage device (150) stores data. The data may be backups, backup stripes, and/or parity stripes. The backup storage device may include multiple disks (e.g., hard disk drives, solid state drives, etc.). Each disk may store a portion of the data. For example, a backup stripe may be divided into data chunks. Each disk of the backup storage device may store one or more data chunks.

Figure 4:
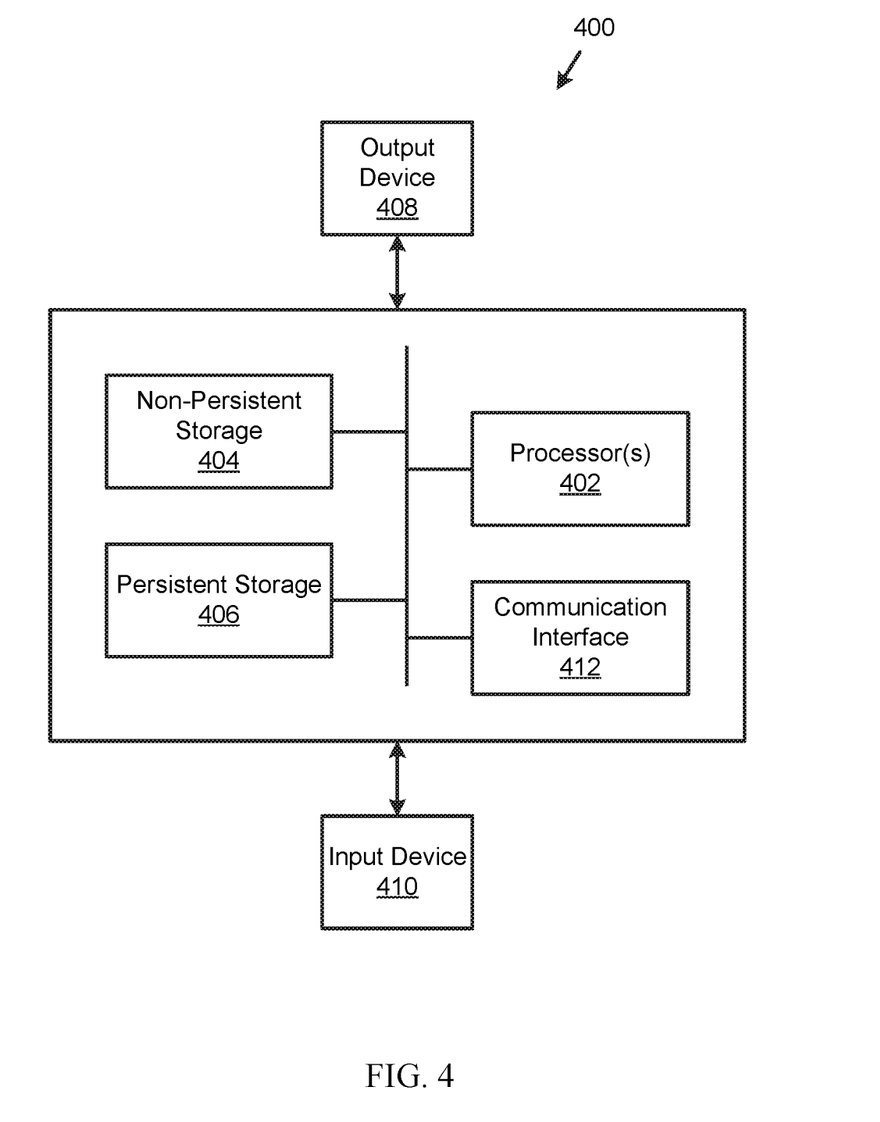
FIG. 4 shows a diagram of a computing device in accordance with one or more embodiments of the invention.

In one or more embodiments of the invention, the backup storage device (150) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor (s) of the computing device cause the computing device to perform the functionality of the backup storage device described throughout this application.

In one or more embodiments of the invention, the backup storage device (150) is implemented as a logical device. The logical device may utilize the computing resources of any number of computing devices and thereby provide the functionality of the backup storage device (150) described throughout this application.

In one or more embodiments of the invention, the clients (not shown) that interact with the host computing device may be a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client described throughout this application.

In one or more embodiments of the invention, the client is implemented as a logical device. The logical device may utilize the computing resources of any number of computing devices and thereby provide the functionality of the client described throughout this application.

While FIG. 1 shows the architecture of the host computing device, the invention is not limited to the architecture shown in FIG. 1.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for managing client requests in accordance with one or more embodiments of the invention. The method shown in FIG. 2A may be performed by, for example, a host OS (110, FIG. 1). Other components of the system illustrated in FIG. 1 may perform the method of FIG. 2A without departing from the invention.

Turning to FIG. 2A, in step 200, a client request is obtained. In one or more embodiments of the invention, the client request is obtained from a client VM. The client request may include a request to store data in a backup storage device. Further, the client request may specify a processing task(s) to perform on the data prior to storing it in the backup storage device.

In step 202, the data associated with the client request is stored in shared memory. In one or more embodiments of the invention, the host OS obtains the data from the client request. In another embodiment of the invention, the data associated with the client request is obtained by the host OS from an external storage device operatively connected to the host computing device. in this scenario, the client request may include information that identifies the location of the data associated with the client request. The information may be a physical address, a logical address, a uniform resource locator (URL), any other information that may be used to obtain the data, or any combination thereof.

In step 204, a determination is made about whether to offload data processing. If the host OS offloads data processing, the method proceeds to step 210; otherwise, the method proceeds to step 208. In one or more embodiments of the invention, the host OS may determine whether to offload the data processing by identifying an amount of computing resources (e.g., processing and memory) required to complete the data processing and comparing that amount to an amount of computing resources available to the host OS. If the host OS determines that the amount needed to perform data processing is greater than the amount available to the host OS, the host OS may determine to offload the parity processing. In another embodiment of the invention, depending on what additional processing the client request specifies, the host OS may determine it does not have the functionality to perform this additional processing and, as such, offloads the processing. In yet another embodiment, the client request itself may specify that the processing of the client request (or at least a portion thereof) is to be offloaded. In one or more embodiments of the invention, the host OS uses other methods to determine whether to offload the processing without departing from the invention.

In step 206, data processing is performed on the data associated with the client request using a processor of the host computing device to generate processed data. In one or more embodiments of the invention, the data processing is performed using a processing pipeline.

In one or more embodiments of the invention, a processing pipeline is a series of processing tasks that is performed on data to process it. Examples of processing tasks that may process data include lossless compression algorithms, deduplication operations, redundant array of independent disks (RAID) parity calculations, data integrity calculations (e.g., cyclic redundancy check (CRC)), and/or any other tasks without departing from the invention.

In one or more embodiments of the invention, the processing pipeline specifies an order in which to perform the processing tasks. For example, a processing pipeline may specify performing a compression algorithm on data in order to generate compressed data as a first processing task and to perform a data integrity field (DIF) calculation on the compressed data as a second processing task. Further, the processing tasks may specify the generation of intermediate data, such as, for example, the compressed data discussed above. The processing tasks may be performed on the data associated with the client request and/or the intermediate data. Additional, different, or other processing tasks may be performed without departing from the invention.

In one or more embodiments of the invention, the processing tasks specified by the processing pipelines may be performed in parallel. In other words, the processing capabilities of the computing resources performing (e.g., a processor, GPU, etc.) the data processing may allow for multiple processes to be performed. In such a scenario, the data associated with the client request, stored in shared memory, may be divided such that the multiple cores of the computing resources (e.g., a processor, GPU, etc.) can each perform the processing task of a portion of the data in parallel.

In one or more embodiments of the invention, a lossless compression algorithm is an algorithm that encodes portions of data (i.e., a file) wherein the encoded portions take up less data than the original portions for the purpose of reducing the total amount of data used by the file. The files that have undergone lossless compression may be restored to the original data through decoding the encoded portions. Examples of lossless compression algorithms include a Lempel-Ziv-Markov chain algorithm (LZMA), run-length encoding (RLE), and/or other types of lossless compression without departing from the invention.

In one or more embodiments of the invention, a processing task may include a lossy compression algorithm. In one or more embodiments of the invention, a lossy compression algorithm may be an algorithm that, similar to a lossless compression algorithm, encodes portions of data (i.e., a file) wherein the encoded portions take up less data than the original portions, but unlike a lossless compression algorithm, a lossy compression algorithm may cause a loss of some of the original portions such that the quality of the file is reduced when the encoded portions are unencoded. Examples of lossy compression algorithms include Moving Picture Experts Group Layer-3 (MP3) format, Ogg Vorbis format, Tagged Image File Format (TIFF), and/or other types of lossy compression algorithms without departing from the invention.

In one or more embodiments of the invention, the data integrity calculations are calculations performed for the purpose of protecting the data and ensuring data integrity after the data is stored. Data integrity may be a measurement of the consistency of data during the generation, storage, and recovery of the data. Data integrity may be monitored using, for example, a data integrity field (DIF). A DIF is additional data added to original data for data protection purposes during storage. The DIF may include adding an 8-byte extension to a 512-byte file. The data in the 8-byte extension may include additional metadata and/or protection tags. The additional 8-byte extension may be used to check the data integrity of the stored data to determine proper storage of the data.

The host OS may identify a processing pipeline to perform based on the client request. In one or more embodiments of the invention, the client request includes a processing pipeline to use when processing the data prior to storing it in a backup storage device.

In another embodiment of the invention, the client request may include an identifier associated processing pipeline. In another embodiment the client request may not include any information about processing pipelines; however, the host OS may determine a processing pipeline (from a set of processing pipelines) to apply to the data based on data storage policies implemented by the host OS. In one or more embodiments of the invention, the host OS implements data storage policies that specify how to process data that is to be stored. For example, a data storage policy may specify that backups of client VMs be stored using a compression algorithm. In this scenario, if the data to be stored is a backup, the host OS may select a processing pipeline that includes performing a compression algorithm and then process the data in accordance with the selected processing pipeline. The invention is not limited to the aforementioned examples.

In one or more embodiments of the invention, the processing pipelines may be modified and/or updated by the host operating system at any point in time. In such scenarios, the host operating system may provide the appropriate updates to the specialized VMs. The updates may include any information that is necessary for the specialized VMs to instruct the GPUs to perform the processing specified in the updated processing pipelines.

Continuing with the discussion in FIG. 2A, after the data associated with the client request is processed in step 206, the process proceeds to step 210.

Returning to Step 204, when the client request (or a portion thereof) is to be offloaded, then in step 208 the host OS sends an offload request to a specialized VM using an offload component. In one or more embodiments of the invention, the offload component obtains the request to offload the data processing and converts the request to a format readable to the specialized VM. The converted request (i.e., the offload request) may be subsequently sent to the specialized VM. In one or more embodiments of the invention, the specialized VM performs the data processing via the method illustrated in FIG. 2B. The specialized VM may perform the processing via other methods without departing from the invention. In one or more embodiments of the invention, the offload request specifies a processing pipeline to be used by the specialized VM when processing the data. As discussed above, the processing pipeline specified in the offload request may be (i) included in the original client request; (ii) referenced in the original client request (e.g., using an identifier); or (iii) determined by the host operating system. In another embodiment of the invention, the offload request may not include or specify any processing pipeline.

In one embodiment of the invention, the host OS may also include functionality to select a specialized VM from the set of specialized VMs. For example, if there are multiple specialized VMs each associated with a common type of GPU, then the host OS may select a specialized VM such that load is balanced across the set of specialized VMs.

In another embodiment of the invention, in scenarios in which the specialized VMs are associated with different types of GPUs and the GPUs have different functionality, then the host OS may include functionality to: (i) obtain information about the GPUs and/or the specialized VMs and (ii) select an appropriate specialized VM based on the processing pipeline to be used to process the data the information in (i).

Continuing with the discussion of FIG. 2A, in step 210, after the specialized VM has completed the data processing (in response to the offload request that was issued in step 208), a notification of the completed data processing is obtained by the host OS.

In one or more embodiments of the invention, the notification is sent from the specialized VM that obtained the offload request in step 208. The offload component may convert the notification to a readable format for the host OS. The notification may specify that the processed data is stored in the shared memory. Further, the notification may include an address(es) for the processed data that the host OS may use to retrieve the processed data.

In step 212, the processed data is obtained from the shared memory and sent to a backup storage device. In one or more embodiments of the invention, the host OS utilizes computing resources (e.g., a processor) of the hardware layer of the host computing device to send the processed data.

FIG. 2B shows a flowchart for managing data processing in accordance with one or more embodiments of the invention. The method shown in FIG. 2B may be performed by, for example, a specialized VM (104, FIG. 1). Other components of the system illustrated in FIG. 1 may perform the method of FIG. 2B without departing from the invention.

In step 220, an offload request is obtained from a host operating system.

In step 222, a processing pipeline is determined based on the offload request to obtain an identified processing pipeline. In one or more embodiments of the invention, the offload request specifies a processing pipeline that is to be used to process data stored in the shared memory. In such a scenario, the specialized VM may determine to perform the specified processing pipeline.

In one or more embodiments of the invention, the offload request does not specify a processing pipeline to use for processing the data. In such a scenario, the processing pipeline is determined based on data processing policies implemented by the specialized VM. The data processing policies may specify a processing pipeline and/or one or more processing tasks to perform based on the data associated with the offload request. For example, the data associated with the offload request may be a backup of a client VM. The specialized VM may implement a data processing policy that specifies that backups of VMs be processed using a compression algorithm and by calculating a data integrity calculation of compressed data. The specialized VM may identify a processing pipeline that specifies performing a compression algorithm and calculating a data integrity field of compressed data.

In step 224, data processing of the data is performed by a GPU(s) based on the identified processing pipeline to generate processed data. In one or more embodiments of the invention, the specialized VM sends processing requests to one or more GPUs to perform the data processing in accordance with the processing pipeline. The data processing may include performing the series of processing tasks specified in the processing pipeline in the specified order.

In one or more embodiments of the invention, each processing request specifies a processing task of the identified processing pipeline for the GPU(s) to perform on the data. The processing requests may be sent in accordance with the order specified by the processing pipelines. For example, if the processing pipeline specifies a first processing task and a second processing task to be performed after the first, the specialized VM sends a first processing request to the GPUs that specifies the first processing task. After the first processing task is complete, the specialized VM sends a second processing request that specifies the second processing task to be performed.

In one or more embodiments of the invention, a processing request specifies all processing tasks of the identified processing pipeline. In other words, the processing request is sent once to the GPUs to fully specify the identified processing pipeline to be performed on the data by the GPUs.

In one or more embodiments of the invention, the GPUs service the processing requests by obtaining data from the shared memory and processing the data in accordance with the processing task(s) specified by each processing request to obtain a result. In scenarios in which the processing requests specify all processing tasks of the identified processing pipeline, the result is processed data. In scenarios in which each processing request specifies a portion of the processing tasks of the identified processing pipeline, the result may be intermediate data, which is locally stored in the GPU(s). GPU(s) may further process the intermediate data in accordance with additional processing requests issued by the specialized VMs. The GPUs may store the result (i.e., the data that is generated in response to processing by the processing pipeline) in the shared memory.

In one embodiment of the invention, the specialized VMs issue processing requests to the GPU(s) in a manner that optimizes the processing of the data in accordance with the data pipeline. For example, if the GPU supports parallel processing and the processing that is specified in the processing pipeline may be performed in a parallelized manner on the same GPU (or across multiple GPUS), the specialized VM may generate and issue processing requests that instruct the GPU(s) to process the data in a parallelized manner. The invention is not limited to the above example.

In step 226, the host OS is notified of completion of data processing. In one or more embodiments of the invention, the specialized VM stores the processed data in the shared memory. The notification may include addresses (logical or otherwise) that specify the processed data stored in the shared memory.

Example

Figure 3:
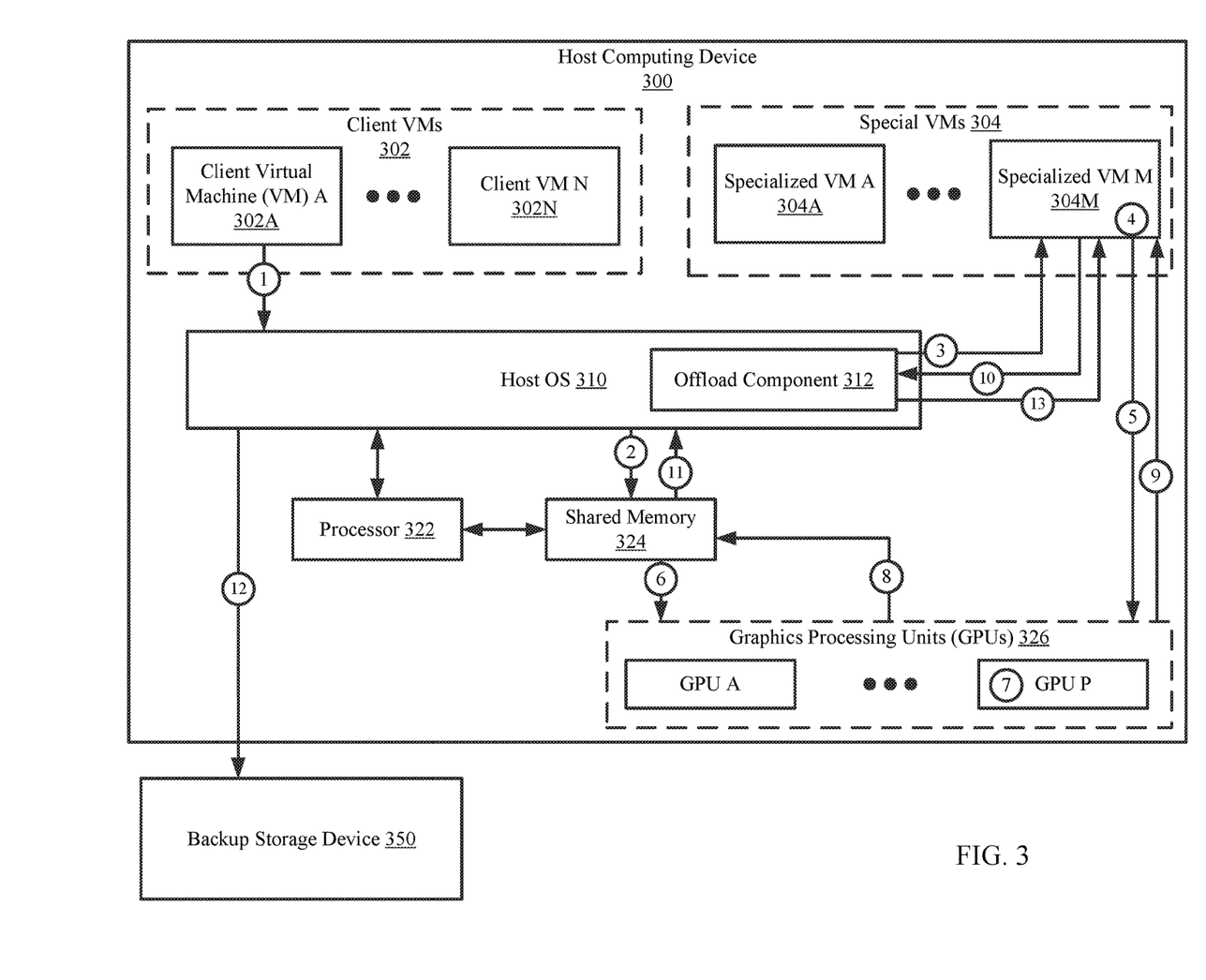
FIG. 3 shows an example in accordance with one or more embodiments of the invention.

The following section describes an example. The example, illustrated in FIG. 3, is not intended to limit the invention. Turning to the example, consider a scenario in which a client VM (302A) requests a backup to be stored in a backup storage (350). The host computing device (300) may perform actions (labeled in FIG. 3 using numbered circles) based on the methods of FIGS. 2A-2B. Each numbered circle illustrated in FIG. 3 may represent a portion of the methods performed by components of the host computing device (300). The methods may be discussed below.

The client VM (302A) sends a client request to the host OS (310) [1]. The client request may specify storing data in a backup storage device (350). The client request may specify that the data be processed prior to storing in the backup storage device (350). The host OS (310), following the method of FIG. 2A, stores data associated with the client request in shared memory (324) [2].

The host OS (310), after obtaining the client request, continues the method of FIG. 2A to determine whether the host OS should offload the processing. The host OS (310) may implement data storage policies that specify how to process the data prior to storing it in a backup storage device (350). A data storage policy may specify that backups of a client VM are to be compressed and tagged with a data integrity field (DIF). The host OS (310) may determine that the data processing specified in the data storage policy requires more processing capabilities than the processor (322) is able to perform. Based on the determination, the host OS (310) uses an offload component (312) to send an offload request to a specialized VM (304M) [3]. The offload request does not specify any processing pipeline.

The specialized VM (304M), upon receipt of the offload request, identifies a processing pipeline to perform on the data specified in the offload request. In this example, an identified processing pipeline specifies performing a LZMA compression algorithm on the data to generate compressed data as a first processing task and performing a DIF calculation on the compressed data to generate processed data as a second processing task [4].

The specialized VM (304M) instructs the GPUs (326) to perform the compression algorithm and CRC calculations [5]. The GPUs (326) obtain the data from shared memory (324) [6]. The GPUs (326) may process the data in accordance with the identified processing pipeline, resulting in processed data [7]. After processing the data, the GPUs (326) may store the processed data in the shared memory (324) [8].

The specialized VM (304M) may be notified of completed data processing [9]. The specialized VM (304M) may forward the notification to the host OS (310) [10]. The notification may include logical addresses specifying the location of the processed data stored in the shared memory (324). The host OS (310) may use the addresses to obtain the processed data [11]. The host OS (310) stores the data in the backup storage device (350) [12]. The host OS (310) may utilize the processor (322) to send the processed data to the backup storage device.

End of Example

While the above description of the invention has been described with respect to GPUs, embodiments of the invention may be implemented using any other type of processing unit. The processing unit may include specialized processing hardware, non-specialized processing hardware, and temporary storage (e.g., volatile memory).

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the delegation of performing specific operations during a backup procedure by a computing device with multiple processors each with varying capabilities.

A computing device may include a processor (e.g., a CPU) that may be suited to perform a portion of operations of a backup procedure that involves a small number of complex computations. The backup procedure may include performing large numbers of simple, arithmetic calculations. Embodiments of the invention may offload the large number of simple calculations to graphics processing units. Because the GPUs include a larger number of processing cores compared to a CPU, the GPU may be suited to more efficiently complete the larger number of simple calculations.

Additionally, embodiments of the invention include using specialized VMs that identify a processing pipeline to be used to perform on data to generate processed data prior to storage. The specialized VMs may identify the most efficient processing pipeline to perform the data processing.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing data, the method comprising:
   receiving an offload request by a first virtual machine (VM), wherein the offload request is obtained from an offload component executing in a host operating system;

determining a processing pipeline from a plurality of processing pipelines;

issuing, in response to the offload request and based on the processing pipeline, a processing request to a processing unit, wherein the processing request comprises reference to data;

servicing, by the processing unit, the processing request, wherein servicing the processing request comprises:

obtaining the data from shared memory using the reference to the data;

generating a result using the data and using the processing pipeline; and storing the result in the shared memory;

obtaining, by the host operating system, the result from the shared memory;

combining the result with the data to obtain an updated result; and providing the updated result to an external computing device, wherein the first VM, the host operating system, and the processing unit are executing on a computing device.

2. The method of claim 1, further comprising:

receiving a second offload request by a second VM executing on the computing device;

issuing, in response to the second offload request and based on a second processing pipeline, a second processing request to the processing unit; and servicing, by the processing unit, the second processing request to obtain a second result.

3. The method of claim 2, further comprising:

prior to issuing the second offload request, obtaining the second processing pipeline from a host operating system by the second VM, wherein the second VM is executing on the host operating system.

4. The method of claim 1, further comprising:

issuing, in response to the offload request and based on the processing pipeline, a second processing request to the processing unit; and servicing, by the processing unit, the second processing request to obtain a second result, wherein the second result is based on the result.

5. The method of claim 4, wherein the processing pipeline specifies at least a first processing task and a second processing task, wherein the processing request is associated with the first processing task and the second processing request is associated with the second processing task.

6. The method of claim 1, wherein the offload request is issued by an offload component executing in a host operating system, wherein the first VM is executing on the host operating system.

7. The method of claim 6, wherein the offload request is issued in response to a client request issued by a third VM executing on the host operating system.

8. The method of claim 1, wherein the processing unit is a graphics processing unit (GPU).

9. The method of claim 1, wherein the processing pipeline specifies a plurality of processing tasks.

10. The method of claim 9, wherein at least one processing task of the plurality of tasks is compression or a data integrity calculation.

11. A non-transitory computer readable medium comprising computer readable program code, which when executed by a computer processor enables the computer processor to perform a method for processing data, the method comprising:

receiving an offload request by a first virtual machine (VM), wherein the offload request is obtained from an offload component executing in a host operating system;

determining a processing pipeline from a plurality of processing pipelines;

issuing, in response to the offload request and based on the processing pipeline, a processing request to a processing unit, wherein the processing request comprises reference to data;

servicing, by the processing unit, the processing request, wherein servicing the processing request comprises:

obtaining the data from shared memory using the reference to the data;

generating a result using the data and using the processing pipeline; and storing the result in the shared memory;

obtaining, by the host operating system, the result from the shared memory;

combining the result with the data to obtain an updated result; and providing the updated result to an external computing device, wherein the first VM, the host operating system, and the processing unit are executing on a computing device.

12. The non-transitory computer readable medium of claim 11, wherein the method further comprises:

issuing, in response to the offload request and based on the processing pipeline, a second processing request to the processing unit, wherein the processing unit services the second processing request to obtain a second result, wherein the second result is based on the result.

13. The non-transitory computer readable medium of 12, wherein the processing pipeline specifies at least a first processing task and a second processing task, wherein the processing request is associated with the first processing task and the second processing request is associated with the second processing task.

14. A system, comprising:

a processor;

a plurality of processing units;

shared memory;

a host operating system executing on the processor;

a plurality of virtual machines (VMs) executing on the host operating system;

wherein a first VM of the plurality of VMs is programmed to:

receive an offload request from the host operating system;

determining a processing pipeline of a plurality of processing pipelines;

issue, in response to the offload request and based on the processing pipeline, a processing request to a processing unit of the plurality of processing units, wherein the processing request comprises referenc to data; and wherein the processing unit is configured to service the processing request to obtain a result and store the result in the shared memory, wherein servicing the processing request comprises:

obtaining the data from the shared memory using the reference to the data;

generating the result using the data; and storing the result in the shared memory;

wherein the host operating system is programmed to:

obtain the result from the shared memory;

combining the result with the data to obtain an updated result; and providing the updated result to an external computing device.

15. The system of claim 14, wherein the processing unit is a graphics processing unit (GPU).

16. The system of claim 15, wherein a processing task of the plurality of processing tasks is one of: a compression or a data integrity calculation.

17. The system of claim 14, wherein the processing pipeline specifies a plurality of processing tasks.

* * * * *